United States Patent [19]
Okamoto et al.

[11] Patent Number: 4,798,057
[45] Date of Patent: Jan. 17, 1989

[54] REFRIGERATING APPARATUS AND CONTROL METHOD THEREOF

[75] Inventors: Hiroshi Okamoto, Fuji; Kimio Fushimi, Shimizu; Susumu Suzuki, Numazu, all of Japan

[73] Assignee: Kabushiki Kaisha Toshiba, Kawasaki, Japan

[21] Appl. No.: 22,816

[22] Filed: Mar. 6, 1987

[30] Foreign Application Priority Data

Mar. 28, 1986 [JP] Japan .................. 61-68674

[51] Int. Cl.⁴ .................................... F25B 1/00
[52] U.S. Cl. .................. 62/228.3; 62/209; 62/228.4
[58] Field of Search .......... 62/228.3, 228.1, 228.4, 62/228.5, 215, 203, 208, 209, 217, 176.3, 196.2; 236/1 EA

[56] References Cited

U.S. PATENT DOCUMENTS

| | | | | |
|---|---|---|---|---|
| 1,750,336 | 3/1930 | Terry | ..................................... | 62/209 |
| 2,267,607 | 12/1941 | Harvey | .......................... | 62/228.3 X |
| 4,220,013 | 9/1980 | Harnish | .............................. | 62/209 |
| 4,480,442 | 11/1984 | Ide et al. | ...................... | 62/228.4 X |

FOREIGN PATENT DOCUMENTS

| | | |
|---|---|---|
| 54-88642 | 7/1979 | Japan . |
| 54-21878 | 8/1979 | Japan . |
| 60-39842 | 3/1985 | Japan . |

Primary Examiner—Harry B. Tanner
Attorney, Agent, or Firm—Cushman, Darby & Cushman

[57] ABSTRACT

A refrigerating apparatus executing the redistributing operation of refrigerant when the actual suction pressure of a compressor is lower than a suction pressure lower limit value. The suction pressure lower limit value is varied in response to the condensation temperature of refrigerant which varies in accordance with the actual temperature in the vicinity of a condenser. When the condensation temperature of refrigerant is greater than a predetermined comparison value, a first limit value is selected as the suction pressure lower limit value. Otherwise, a second limit value less than the first limit value is selected. The refrigerating apparatus may be controlled in accordance with the selected suction pressure lower limit value.

17 Claims, 4 Drawing Sheets

REFRIGERATING APPARATUS AND CONTROL METHOD THEREOF

BACKGROUND OF THE INVENTION

1. Field of the invention

The present invention relates, in general, to refrigerating apparatus. More specifically, the invention relates to a refrigerating apparatus in which a microcomputer controls the capacity of a compressor in response to a refrigerating load to maintain the suction pressure of the compressor at a predetermined value.

2. Description of the prior art

Refrigerating apparatus including a microcomputer and an inverter circuit are well known. In this conventional refrigerating apparatus, the output of a compressor is controlled by the microcomputer through the inverter circuit in response to the changes of a refrigerating load.

An example of the above-described refrigerating apparatus is shown in FIG. 1. A refrigerating cycle 11 includes a compressor 13, a condenser 15, a liquid tank 17, an expansion valve 19, an evaporator 21, and an accumulator 23, all connected in series. Expansion valve 19 and evaporator 21 are arranged in a display case 25 to refrigerate food stored in the case. A suction pressure sensor 27 is provided at the suction side 13a of compressor 13. A detection signal from suction pressure sensor 27 is fed to a control circuit 29, such as a microcomputer. The microcomputer controls a driving frequency for compressor 13 through an inverter circuit 31 in response to the detection signal to maintain the suction pressure of compressor 13 at a prescribed value.

Generally, high efficiency of a refrigerating cycle is achieved by maintaining the temperature of an evaporator at a specific value calculated from the design specification of the refrigerating cycle. There is a specific relationship between the condensation temperature of refrigerant and the suction pressure of a compressor. If the suction pressure of the compressor goes down, the condensation temperature of the refrigerant falls.

In FIG. 1, if the suction pressure of compressor 13 is controlled to a prescribed pressure value, a high efficiency of refrigerating cycle 11 can be achieved. In this refrigerating cycle, the driving frequency for compressor 13 is varied in response to the difference between the prescribed pressure value of the suction pressure and the actual suction pressure value of compressor 13 detected by sensor 27. Thus, the actual suction pressure of compressor 13 is controlled to the prescribed pressure value, as shown in FIG. 2.

In FIG. 2, a plurality of frequency variation zones are determined in accordance with the deviation of the suction pressure of the compressor. A specific frequency value is set in each frequency variation zone. The driving frequency for compressor 13 is changed on the basis of the frequency value in the frequency variation zone correcting the pressure deviation of compressor 13. Thus, the actual suction pressure of compressor 13 is changed to the prescribed pressure value. During the refrigerating operation, if the suction pressure of compressor 13 is changed due to the change of a refrigerating load, the driving frequency for compressor 13 is changed on the basis of the frequency value in the corresponding frequency variation zone until the suction pressure of compressor 13 reaches the prescribed pressure value. If the suction pressure of compressor 13 falls below a suction pressure lower limit value Lv notwithstanding the control of the driving frequency for compressor 13, compressor 13 is stopped after the execution of the refrigerant pumping down operation.

During a refrigerating operation, a fluid mixture of refrigerant and lubricating oil is circulated through a refrigerating cycle by the compressor. When the compressor stops, the fluid mixture remains at its position in the refrigerating cycle. In particular, a large amount of refrigerant stays in the evaporator. This is because the dissolution of refrigerant into lubricating oil is promoted under a low temperature. When the compressor is reenergized, refrigerant in the evaporator flows into the compressor with a rush. This causes elements such as the leaf valve of the compressor to be damaged. The pumping down operation is carried out to prevent such an accident.

In pumping down operation, the electromagnetic valve arranged at the intake side of the evaporator is closed. Refrigerant existing between the evaporator and the compressor is collected on the discharge side of the compressor (redistribution of refrigerant).

The suction pressure lower limit valve Lv is determined in order to prevent compressor 13 from an abnormal operation. This lower limit value Lv is, in general, determined within the range of $-0.5$ kg/cm to $-1.0$ kg/cm against the prescribed pressure value (set value Sv).

In the above-described refrigerating apparatus, since the suction pressure lower limit value Lv is a fixed value the refrigerating apparatus has disadvantages, as described below.

In a small refrigerating load, e.g. in winter, the suction pressure of compressor 13 frequently falls below the lower limit value Lv. Therefore, the refrigerating apparatus frequently executes the refrigerant pumping down operation, rather than the refrigerating operation, in response to changes of the suction pressure of compressor 13.

In summer, since the actual temperature is relatively high, the refrigerating operation is carried out under a low suction pressure of the compressor below the set value Sv. On the other hand, since the discharge pressure of the compressor tends to increase because of a high actual temperature, the compressing ratio Pd/Ps (Pd: discharge pressure, Ps: suction pressure) of the compressor increases. Furthermore, the suction pressure of the compressor seldom falls below the lower limit value Lv during the refrigerating operation. As a result, the temperature of the compressor increases.

According to the conventional refrigerating apparatus described above, since the suction pressure lower limit value Lv of the compressor is set to a constant value regardless of the temperature of the atmosphere, energy consumption loss of the compressor is caused in winter, and the load of the compressor is increased in summer.

SUMMARY OF THE INVENTION

It is an object of the invention to effectively control a compressor of a refrigerating apparatus in all seasons.

It is another object of the invention to protect a compressor of a refrigerating apparatus against excessive heating.

Additional objects and advantages will be obvious from the description which follows, or may be leaved by practice of the invention.

To accomplish the above objects, a refrigerating apparatus includes a refrigerating cycle having a compressor, a condenser and an evaporator for flowing refrigerant, and a control circuit for varying the suction pressure lower limit value of the compressor in response to the actual temperature. The control circuit may include memory areas for storing a first lower limit value, a second lower limit value smaller than the first lower limit value, and a third lower limit value smaller than the second lower limit value. Preferably, the refrigerating apparatus further includes a temperature detection circuit for generating a temperature detection signal corresponding to a condensation temperature of refrigerant at the output side of the condenser which changes in accordance with the actual temperature.

When the temperature detection signal is greater than a first comparison value, the first lower limit value may be selected as a suction pressure lower limit value.

When the temperature detection signal is smaller than a second comparison value less than the first comparison value, the third lower limit value may be selected.

When the temperature detection signal is between the first and second comparison value, the second lower limit value may be selected.

Preferably, the refrigerating apparatus further includes a pressure detecting device for generating a pressure detecting signal corresponding to the suction pressure of the compressor, and an inverter circuit for varying the driving frequency for the compressor.

When the pressure detection signal is greater than the selected lower limit value, the compressor may be controlled through the inverter to maintain the suction pressure thereof to a predetermined set value. Otherwise, the compressor would stop after the refrigerating pumping down operation was executed.

The compressor of the refrigerating apparatus may be controlled in accordance with a suction pressure lower limit value selected in response to the actual temperature.

BRIEF DESCRIPTION OF THE DRAWINGS

The present invention is best understood with reference to accompanying drawings in which.

DETAILED DESCRIPTION OF THE PREFERRED EMBODIMENT

Figure 1:
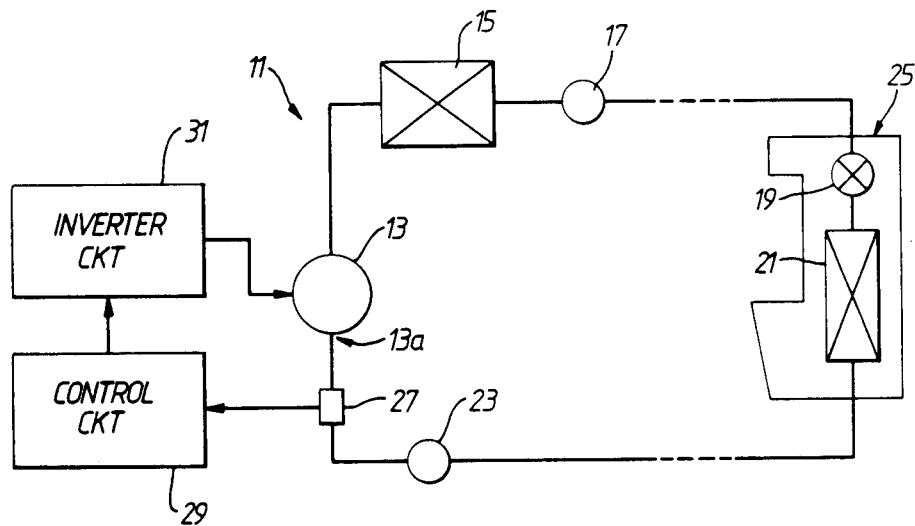
FIG. 1 is a schematic view of a conventional refrigerating apparatus.
Figure 2:
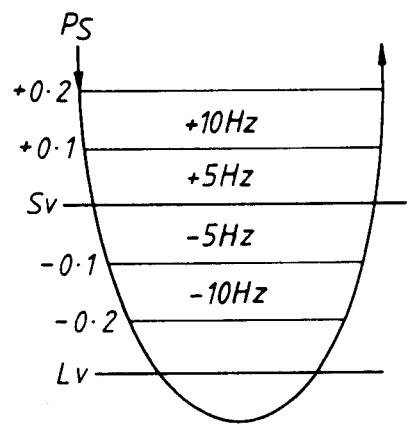
FIG. 2 is a diagram illustrating the relationship between the suction pressure lower limit value of a compressor and the set value of the same in conventional refrigerating apparatus, as shown in FIG. 1.
Figure 3:
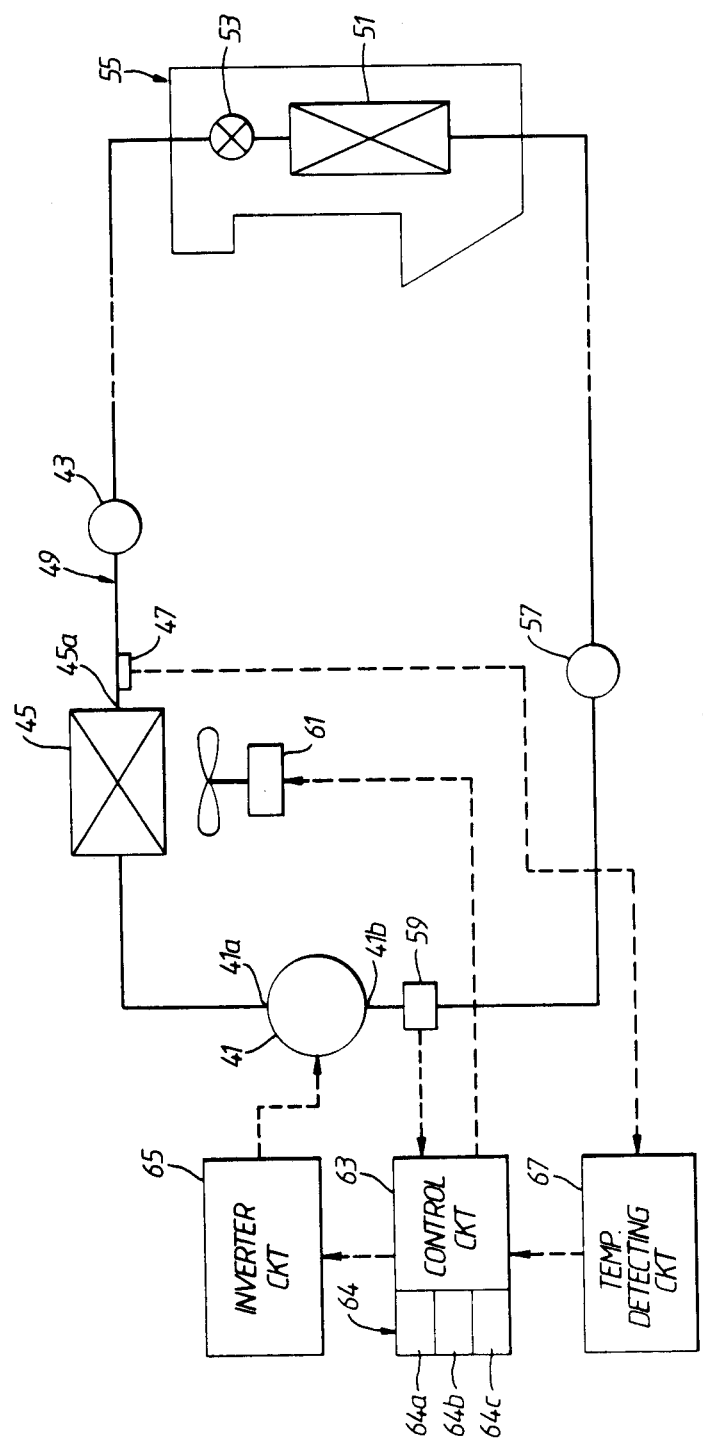
FIG. 3 is a schematic view illustrating the refrigerating apparatus of one embodiment of the present invention.

The preferred embodiment of the present invention will now be described in more detail with reference to the accompanying drawings. FIG. 3 is a schematic view of a refrigerating apparatus of one embodiment of the present invention.

Firstly, a refrigerating cycle arrangement is described hereinafter. The discharge side 41a of a compressor 41 is connected to a liquid tank 43 through a condenser 45 for fluid communication. A temperature sensor 47 is closely attached on the refrigerant pipe 49 at the output side 45a of condenser 45 to detect the condensation temperature of refrigerant. Liquid tank 43 is connected to an evaporator 51 through an expansion valve 53 for fluid communication. Evaporator 51 and expansion valve 53 are arranged in a display case 55 in which articles such as food are stored for refrigeration. Evaporator 51 is connected to the suction side 41b of compressor 41 in a fluid communication state through an accumulator 57. A pressure sensor 59 is provided at the suction side 41b of compressor 41 to detect the suction pressure of compressor 41. A cooling fan 61 is provided opposite to condenser 45 to cool condenser 45.

Figure 4:
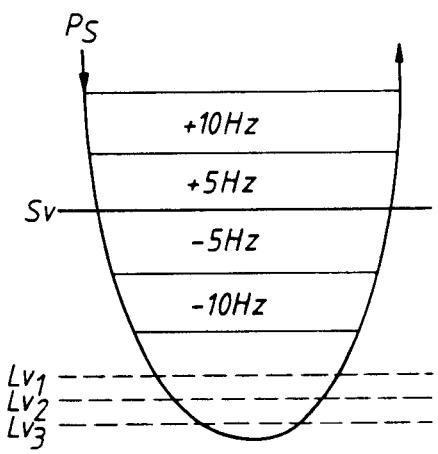
FIG. 4 is a diagram illustrating a relationship between a suction pressure lower limit value of a compressor and a set value of the same in one embodiment, as shown in FIG. 3.

A pressure detection signal from pressure sensor 59 is fed to a control circuit 63, including a microcomputer. Control circuit 63 varies the driving frequency for compressor 41 through an inverter 65 in accordance with the pressure detection signal to maintain the suction pressure of compressor 41 at a set value Sv, as shown in FIG. 4.

In FIG. 3, the temperature detection signal from temperature sensor 47 also is fed to control circuit 63 through a temperature detecting circuit 67. The temperature detection signal of temperature sensor 47 corresponds to the condensation temperature of refrigerant. This temperature, in turn, varies in accordance with the actual temperature. Control circuit 63 changes the suction pressure lower limit value Lv of compressor 41 to a value selected from predetermined pressure lower limit values Lv1, Lv2, and Lv3, as shown in FIG. 4, on the basis of the temperature detection signal.

The pressure lower limit values Lv1, Lv2, and Lv3 are stored in memory areas 64a, 64b, and 64c of control circuit 63, respectively. The first lower limit value Lv1 is greater than the second lower limit value Lv2, and the second lower limit value Lv2 is greater than the third lower limit value Lv3.

Figure 5:
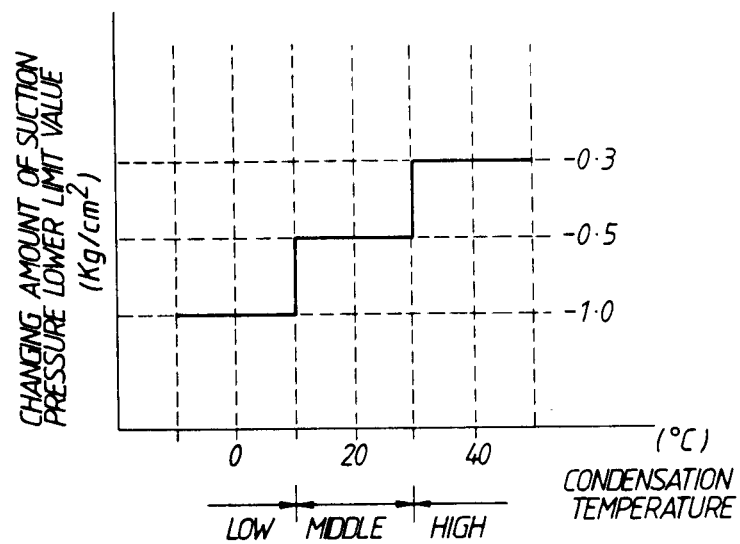
FIG. 5 is a diagram illustrating the relationship between the condensation temperature of refrigerant and the amount of modification of the suction pressure lower limit value from the set value.

An example of suction pressure lower limit values Lv1, Lv2 and Lv3 is disclosed in FIG. 5. FIG. 5 shows predetermined variations of the low limit value Lv from the set value Sv corresponding to different condensation temperatures of refrigerant, based on a set value Sv of zero.

In this embodiment, if the condensation temperature of refrigerant is greater than 30° C. (first reference value), the first lower limit value Lv1 is determined by subtracting 0.3 from the set value Sv. If the condensation temperature is less than 10° C. (second reference value), the third lower limit value Lv3 is determined by subtracting 1.0 from the set value Sv. If the condensation temperature is between 30° C. and 10° C., the second lower limit value Lv2 is determined by subtracting 0.5 from the set value Sv.

Figure 6:
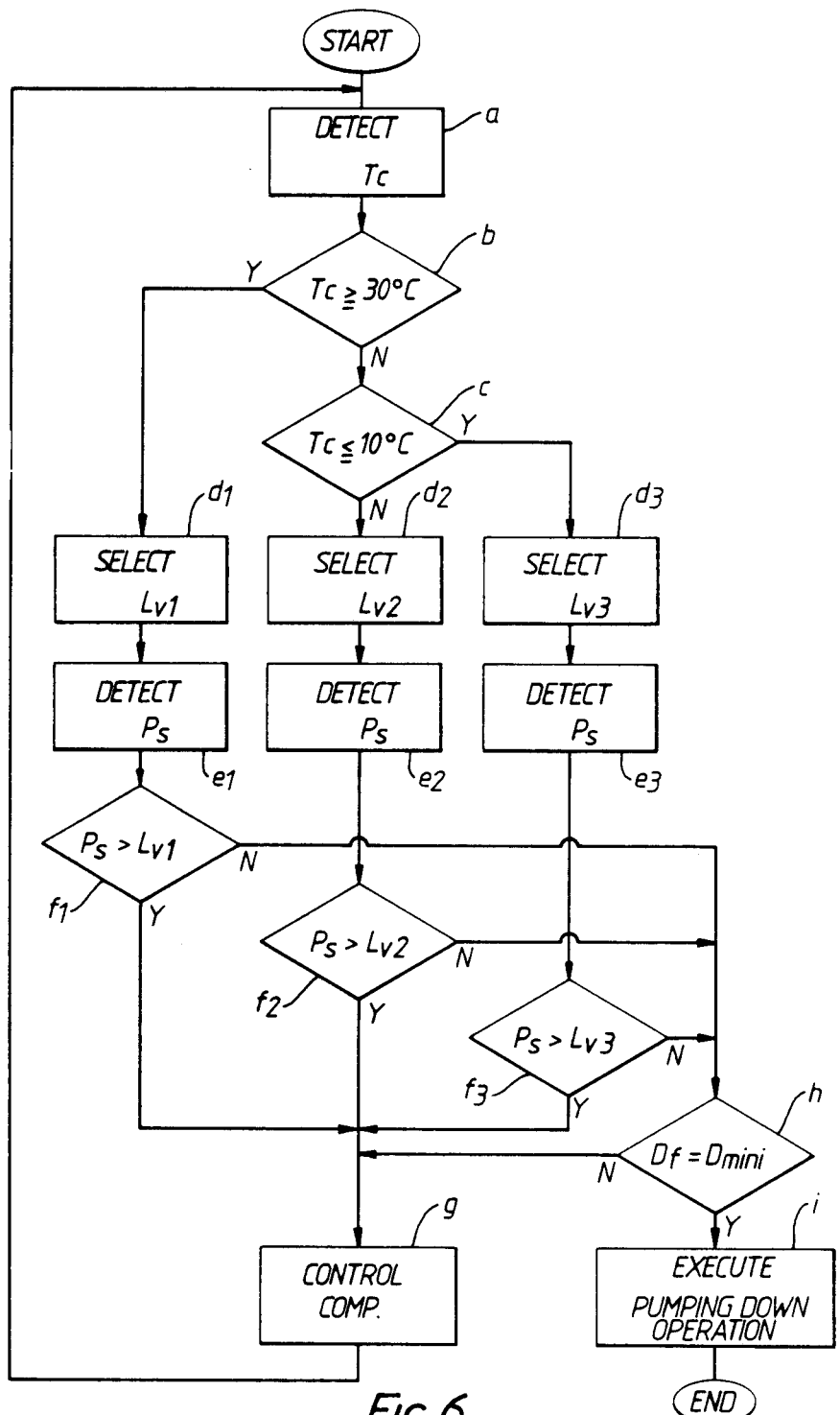
FIG. 6 is a flowchart showing capacity control of a refrigerating apparatus, as shown in FIG. 3.

The operation of the above-described embodiment will be described with reference to FIGS. 3 and 6. In step a, temperature sensor 47 detects the condensation temperature Tc of refrigerant discharged from condenser 45, and the temperature detection signal is fed to control circuit 63 through temperature detection circuit 67. If the actual temperature is low, the condensation temperature Tc also is low. In step b, if the detected condensation temperature Tc is higher than 30° C., the YES-path is taken. Otherwise, the NO-path is taken.

When the YES-path is taken in step b, the first lower limit value Lv1 is selected from memory 64 (step d1). In step e1, pressure sensor 59 detects the suction pressure Ps of compressor 41, and the pressure detection signal is fed to control circuit 63. In step f1, if the detected suction pressure Ps is greater than the first lower limit value Lv1, the YES-path is taken. Otherwise, the NO-path is taken.

When the YES-path is taken in step f1, control circuit 63 drives compressor 41 with a corresponding driving frequency through inverter 65 (step g).

On the other hand, when the NO-path is taken in step f1, the driving frequency Df of compressor 41 is compared with a prescribed minimum driving frequency Dmini (step h). If the driving frequency Df is equal to the minimum driving frequency Dmini, the YES-path is taken. In step i, the refrigerant pumping down operation is executed, and then compressor 41 stops. If the NO-path is taken in step h, the above-described step g is executed.

When the NO-path is taken in step b, the detected condensation temperature Tc is further compared with 10° C. in step C. If the detected condensation temperature Tc is smaller than 10° C., the YES-path is taken. Otherwise, the NO-path is taken.

When the NO-path is taken in step c, the second lower limit value Lv2 is selected (step d2). The following steps e2 and f2 are similar to the above-described steps e1 and f1, and therefore the discussion thereof is omitted.

When the YES-path is taken in step c, the third lower limit value Lv3 is selected (step d3). Since the following steps e3 and f3 also are similar to the steps e1 and f1, the descriptions thereof also are omitted.

In the refrigerating operation described above, the pumping down operation is executed when the suction pressure of the compressor is smaller than the lower limit value, and the driving frequency of the compressor is at its minimum value. This is because the suction pressure of the compressor may be over the lower limit value, if the compressor has been driven beyond its minimum driving frequency value.

As can be understood from the above-described refrigerating operation, the suction pressure lower limit value is varied in response to the condensation temperature of refrigerant which, in turn, varies in accordance with the actual temperature.

In a low temperature environment, such as, e.g., in winter, the entire refrigrating load of a refrigerating apparatus is small because of a low temperature surrounding the display case (refrigerating load). Furthermore, in case of a refrigerating apparatus having a multiple display case, if only one display case is activated, the refrigerating load is extremely small. As a result, the suction pressure of the compressor is low.

Under the conditions as described above, when the compressor is operated after the pressure in the refrigerating cycle is once balanced, the suction pressure of the compressor rapidly decreases, and falls below a predetermined lower limit value. This is because the compressor is driven by a relatively high driving frequency even though the refrigerating load is small. When the suction pressure of the compressor falls below the predetermined lower limit value, the compressor is stopped after the refrigerant pumping down operation is completed. However, since the suction pressure of the compressor only falls below the lower limit value temporarily, an operation cycle including a refrigerating operation, a pumping down operation and a stopping operation is repeatedly carried out. This causes an unnecessary energy consumption loss in the refrigerating apparatus. However, in this embodiment, since the suction pressure lower limit value is varied to a predetermined low value in response to the condensation temperature of refrigerant, the number of times when the suction pressure of the compressor falls below the lower limit value is decreased. Therefore, the number of times the pump down operation is executed also decreases, as compared with the conventional refrigerating cycle wherein the suction pressure lower limit value is fixed. Therefore, energy consumption losses in the refrigerating apparatus may be greatly reduced. When the suction pressure lower limit value is changed to the low value, the compressor is driven under the low suction pressure thereof. However, since the entire refrigerating load of the refrigerating cycle is relatively small, as described above, the discharge pressure of the compressor is not too high. Thus, over heating of the compressor is avoided.

In a high temperature environment, such as, e.g., in summer, the refrigerating load of the refrigerating apparatus is large. Thus, there is less possibility that the suction pressure of the compressor will fall below the suction pressure lower limit value Lv in a conventional refrigerating apparatus, as stated before.

With this embodiment, however, since the suction pressure lower limit value is raised to a predetermined high value in response to the condensation temperature of refrigerant, the refrigerating operation is discontinued when the discharge pressure of the compressor is high, and the suction pressure of the compressor is below the set value Sv. Thus, excessive heating of the compressor may be avoided. Furthermore, the intermittent operation of the compressor is increased due to the increase in the number of times the compressor is stopped. Thus, less energy is consumed in operating the compressor.

The present invention has been described with respect to a specific embodiment. However, other embodiments based on the principles of the present invention should be obvious to those of ordinary skill in the art. Such embodiments are intended to be covered by the claims.

What is claimed is:

1. A refrigerating apparatus comprising:
   refrigerant circuit means including a compressing section having a variable suction pressure, a heat discharging section and a heat absorbing section for communicating refrigerant therethrough; and
   means for controlling the operation of the compressing section, the control means including:
      means for stopping the operation of the compressing section when the suction pressure of the compressing section falls below a preset lower limit value, and
      means for varying the lower limit value in response to the condensation temperature of the refrigerant in that heat discharging section.

2. An apparatus according to claim 1, wherein the control means further includes temperature detecting means for generating a temperature detection signal corresponding to the condensation temperature of the refrigerant at the heat discharging section.

3. An apparatus according to claim 2, wherein the control means further includes memory means for storing a first lower limit value, a second lower limit value smaller than the first lower limit value, and a third lower limit value smaller than the second lower limit value.

4. An apparatus according to claim 3, wherein the control means further includes temperature comparing means for comparing the temperature detection signal level with predetermined first and second comparison values and for outputting the first lower limit value when the temperature detection signal level is greater than the first comparison value, the second lower limit value when the temperature detection signal level is between the comparison values, and a third lower limit value when the temperature detection signal level is below the second comparison value.

5. An apparatus according to claim 2, wherein the control means further includes means for comparing the condensation temperature of the refrigerant with at least one predetermined comparison value and for outputting one of a plurality of predetermined lower limit values.

6. An apparatus according to claim 4, wherein the control means further includes pressure detecting means for generating a pressure detection signal corresponding to the suction pressure of the compressing section.

7. An apparatus according to claim 6, wherein the control means further includes pressure comparing means for comparing the pressure detection signal level from the pressure detecting means with the output lower limit value from the temperature comparing means.

8. An apparatus according to claim 7, wherein the control means further includes pumping means for redistributing refrigerant within the refrigerant circuit means when the pressure detection signal level is smaller than the output lower limit value.

9. An apparatus according to claim 8, wherein the heat discharging section includes a condenser, and the heat absorbing section includes an evaporator.

10. An apparatus according to claim 1, wherein the control means further includes pressure detecting means for generating a pressure detection signal corresponding to the suction pressure of the compressing section.

11. An apparatus according to claim 10, wherein the compressing section includes a compressor.

12. An apparatus according to claim 11 further including inverter means for varying the driving frequency of the compressor in accordance with the difference between the pressure detection signal level and a predetermined suction pressure value for maintaining the suction pressure of the compressor at the predetermined suction pressure value.

13. A capacity control method for a refrigerating apparatus having a compressor, and a condenser, comprising the steps of:
generating a temperature detection signal corresponding to a condensation temperature of refrigerant at the output side of the condenser;
comparing the temperature detection signal level with a predetermined first comparison value;
selecting a first suction pressure lower limit value of the compressor if the temperature detection signal level is greater than the first comparison value;
generating a pressure detection signal corresponding to the suction pressure of the compressor;
comparing the pressure detection signal level with the selected lower limit value; and
controlling the compressor in accordance with the difference between the pressure detection signal level and a predetermined suction pressure level of the compressor for maintaining the suction pressure of the compressor at the predetermined suction pressure level if the pressure detection signal level is greater than the selected lower limit value.

14. A method according to claim 13 further including the step of selecting a second suction pressure lower limit value smaller than the first suction pressure lower limit value if the temperature detection signal level is smaller than a second comparison value less than the first comparison value.

15. A method according to claim 14 further including the step of selecting a third suction pressure lower limit value between the first and second suction pressure lower limit values if the temperature detection signal level is between the first and second comparison values.

16. A method according to claim 15 further including the steps of:
comparing the driving frequency of the compressor with a predetermined minimum driving frequency if the pressure detection signal level is smaller than the selected lower limit value; and
redistributing the refrigerant within the refrigerating apparatus if the driving frequency of the compressor is equal to the predetermined minimum driving frequency.

17. A method for controlling a refrigerating apparatus having a compressing section and a heat discharging section comprising the steps of:
automatically selecting one of a plurality of predetermined lower limit values for the compressing section in response to the condensation temperature of the refrigerant in the heat discharging section of the apparatus;
measuring the actual suction pressure of the compressing section of the apparatus; and
stopping the apparatus when the actual suction pressure of the compressing section falls below the selected lower limit value.

* * * * *